United States Patent [19]

Filthuth

[11] 4,431,921

[45] Feb. 14, 1984

[54] POSITION SENSITIVE PROPORTIONAL COUNTER OF HIGH RESOLUTION WITH DELAY LINE READ OUT TO MEASURE THE SURFACE DISTRIBUTION OF IONIZING RADIATION

[76] Inventor: Heinz A. A. W. Filthuth, 189 Kerner Strasse, D-7547 Wildbad, Fed. Rep. of Germany

[21] Appl. No.: 230,047

[22] Filed: Jan. 29, 1981

[30] Foreign Application Priority Data

Jan. 29, 1980 [DE] Fed. Rep. of Germany ....... 3002950

[51] Int. Cl.$^3$ ........................................ G01T 1/18

[52] U.S. Cl. .............................. 250/374; 250/388

[58] Field of Search ............... 250/374, 375, 385, 388; 313/93

[56] References Cited

U.S. PATENT DOCUMENTS

| | | | |
|---|---|---|---|
| 3,118,064 | 1/1964 | Attix | 250/375 |
| 3,678,274 | 7/1972 | Kawashima | 250/379 |
| 3,772,521 | 11/1973 | Perez-Mendez | 250/385 |
| 3,911,279 | 10/1975 | Gilland et al. | 250/385 |
| 4,011,057 | 4/1977 | Baum | 250/375 |

OTHER PUBLICATIONS

Lee et al., "Proportional Chambers with Monofilar Helical Cathodes for High Spatial Resolution", Nucl. Inst. & Meth., vol. 109, pp. 421-428, (1973).

J. Fischer et al., 152 Nuclear Instr. and Methods, (1978), pp. 451-460.

Lee et al., 104 Nuclear Instr. and Methods, (1972), pp. 179-188.

LeCompte et al., 153 Nuclear Instr. and Methods, (1978), pp. 543-551.

Baru et al., "One-Coordinate Detector for Rapid Multisnap Recording of X-Ray Pictures", *Nuc. Inst. & Meth.,* vol. 152, pp. 195-197, 1978.

Filthuth, "Radioscanning of TLC" Offprint from *Touchstone: Advances in Thin Layer Chromatography,* Chapter 7, pp. 89-123, (1982).

*Pullan et al.,* "Measuring Radionuclide Distribution with Cross-Wire Spark Chambers", *Nucleonics,* vol. 24, pp. 72-75, Jul. 1966.

*Kaplan et al.,* "Multiwire Proportional Chambers for BioMedical Application", *Nucleur Instruments and Methods,* vol. 106, pp. 397-406, 1973.

*Prydz, "Summary of the State of the Art of in Radio Chromotography Analytical Chemistry",* vol. 45, No. 14, pp. 2317-2326, Dec. 1973.

*Primary Examiner*—Janice A. Howell

*Attorney, Agent, or Firm*—Armstrong, Nikaido, Marmelstein & Kubovcik

[57] ABSTRACT

This invention provides a high-resolution, position-sensitive, proportional-counter for ionizing radiation emanating from a surface source of ionizing radiation. There is provided a counting chamber means having an open entrance window on one side of and spaced from the source of ionizing radiation, and an anode counting wire on the other side of the open entrance window. Also, there is provided a counter wall cathode, having a delay line read-out opposite to the entrance window and spaced from the anode. A means, including several orifices for flushing a counting gas through the counting chamber means and out of the open entrance window between the source and the open entrance window, produces a stabilizing counting gas layer that does not mix with the surrounding air. This prevents the sample from being completely surrounding air. This prevents the sample from being completely enclosed so as to be charged up electrostatically. An electronic means is connected to the delay line for providing the read out of the desired high-resolution, position-sensitive, proportional-counter information corresponding to the ionizing radiation emanating from outside the open entrance window.

24 Claims, 3 Drawing Figures

POSITION SENSITIVE PROPORTIONAL COUNTER OF HIGH RESOLUTION WITH DELAY LINE READ OUT TO MEASURE THE SURFACE DISTRIBUTION OF IONIZING RADIATION

BACKGROUND OF THE INVENTION

1. Field of the Invention

The present invention relates to a position sensitive proportional counter with delay line readout. It is related to the method to measure the spatial distribution of ionizing radiation emitted from a surface, —especially to measure the distribution of radioactive labelled thin layer chromatograms and electropherograms, —down to a range of the radiation to several tenth of a millimeter in air at normal atmospheric pressure.

2. Description of the Prior Art

The problem to be solved is to measure fast and in a simple way with high efficiency and high spatial resolution (1 mm and less) the spatial distribution of ionizing radiation, being emitted more or less isotropically, without the use of a mechanical collimator.

The classical method until now is the autoradiography. A very sensitive X-ray film is placed for some time above the surface to be investigated, e.g., a thin layer chromatogram plate. This method is very time consuming, e.g., up to several weeks, and no direct quantitative answer can be obtained. The quantitative measurement of the radioactivity can be made in scraping the radioactive areas (spots) from the thin layer plate and counting their activity by means of a liquid scintillation counter. In some cases the autoradiography is evaluated with a photo-densitometer. A much faster method, is the application of a spark chamber to detect the radioactive distribution, the sparks being recorded on film with a photo camera. Again, this method has similar drawbacks as the autoradiography for quantitative evaluation.

Since many years, thin layer radiochromatograms have been directly measured as they have been capable of not being destroyed with the so called thin layer scanner.

Such a thin layer scanner to measure the radioactive distribution of beta emitters from thin layer chromatogram plates is described in the German Patent DBP No. 1296 826. By means of a mechanical device, the thin layer plate is moved relative to the geiger-counter (or flow through counter) placed above the plate without touching it. The counter has a relatively small entrance window, about 1 mm×40 mm, to achieve the necessary spatial resolution in detecting radioactive labelled compounds, positioned very close to each other in the chromatogram.

With this device one scans in small steps (down to 1 mm) one surface element after the other of a thin layer plate. The measuring time is appreciably reduced compared to the autoradiography. Two disadvantages which cannot be overlooked, however, are that the spatial resolution is limited by the width of the entrance window and, therefore, also the efficiency. The measurement of a typical thin layer plate, 20 cm×20 cm, takes about 20 hours.

Much more sensitive would be, of course, a device capable of measuring quantitatively at once the radioactive distribution, not in successive steps, as the scanner does.

Such a device is known from 150, Journal of Chromatography, 409–418 (1978). The apparatus consists of a position sensitive proportional counter. The counting wire anode of high electrical resistance is on both ends connected to ground with low impedance. An ionizing particle, entering the counter generates at the wire, where it is passed, a current pulse, which at the two ends of the wire is divided in the same ratio as the resistance of the two wire parts, i.e., the two parts between the point of origin of the pulse where the particle has passed the wire and the two ends of the wire.

The two pulses at the end of the wire are amplified with charge sensitive preamplifiers, their pulse height being proportional to $(1-x)$, where x is the distance of the primary charge pulse, i.e. where the particle has passed the wire, to one wire end.

This device has some disadvantages. The efficiency is rather low, about 0.5%. This is because only the very low energy beta particles are detected to obtain a good spatial resolution. For a typical beta emitter, as $^{14}C$, the spatial resolution is about 3 mm.

Another apparatus, developed by the Numelec Company to measure thin layer chromatograms is described in the cited Journal of Chromatography at page 411. The detector is a one dimensional gas flow through counter, which has incorporated parallel to the counting wire (anode), a cylindrical coil made of copper wire, which operates as delay line and gives the position information of the beta particles. The position of the beta particle at the wire is determined in measuring the propagation time of the induced signals into the delay line.

The internal volume of the counter has a height of more than 10 mm and the entrance window of about 250 mm×10 mm is closed off with a mechanical collimator. This collimator is made of thin metal walls (lamina), spaced about 1 mm from each other (like a venetian blind), arranged perpendicular to the wire, to eliminate particle tracks not travelling in a plane perpendicular to the wire. To achieve an efficient collimation, the thin metal walls (lamina) must have a minimum height, increasing therefore the distance between thin layer plate and counter wire, resulting in an important reduction of the detection efficiency of the detector.

The device has the following disadvantages:

1. The counter cannot be operated in the open mode. The entrance window has to be closed off with a thin foil or it has to make direct contact with the surface (thin layer plate) being investigated. In the last case a contamination from the radioactive sources being measured, cannot be avoided; also there is the danger of damage of the surface of the thin layer plate. Finally it is not possible to move automatically the thin layer plate relative to the counter, without direct mechanical contact.
2. The incorporated collimator limits the spatial resolution, reduces the detection efficiency appreciably and deteriorates the ratio of signal to noise (background) due to scattered particles (radiation) at the collimator walls.
3. The geometrical arrangement of the delay line relative to the counting wire is not optimal. The solid angle, wire-delay line, is only a small fraction of $2\pi$. Therefore the ratio signal/noise is not good, limiting the spatial resolution of the detector. The Numelec Company quotes a spatial resolution for $^{14}C$—radiation of 2 mm.

SUMMARY OF THE INVENTION

It is, therefore, an object of the present invention to develop a detector of this kind with better spatial resolution higher efficiency, and without a mechanical collimator. Furthermore there should be no direct mechanical contact of the detector with the surface to be measured. Also it should be possible to operate the counter with an open entrance window. This is demand absolutely necessary and vital to detect radiation of very low range, such as $^3H$—beta radiation.

The problem has been solved in accordance with this invention by providing a counter wall that is, at least in part, the delay line.

It has additionally been advantageous to provide a proportional counter with delay line read out, the counter being flushed continuously with counting gas (or being sealed off). In one embodiment, the counter is closed at the bottom and with an a diaphragm with open window, which can be sealed off with a thin foil, if desired. The anode consists of one or more anode counting wires, and the counterwall opposite to the entrance window is the delay line, or part of it, to view the wires with the largest possible solid angle. The position of the radiation emitted from the surface is obtained by measuring the time difference of propagation of the signal induced into the delay line to its two ends, the primary signal being generated at the anode counting wires by the emitted radiation.

Time differences down to 1 nsec ($10^{-9}$) have to be measured to obtain a good spatial resolution. This demands very high quality in the delay line. For a delay time of several 100 nsec over a relatively short length of 20 cm to 30 cm the pulse rise time should not deteriorate, also the attenuation of the pulse height between the two ends of the delay line should be very small.

With the proper selection of elements, construction and use, the delay line, as described in more detail hereinafter, unexpectedly provides the desired counter.

The above and further objects and advantages of this invention will become apparent from the following description when read in connection with the accompanying drawings, and the novel features will be particularly point out in the accompanying claims. To this end, the drawings are for illustration.

BRIEF DESCRIPTION OF THE DRAWINGS

In the drawings, where like elements are referenced alike.

DESCRIPTION OF THE PREFERRED EMBODIMENT

Figure 1:
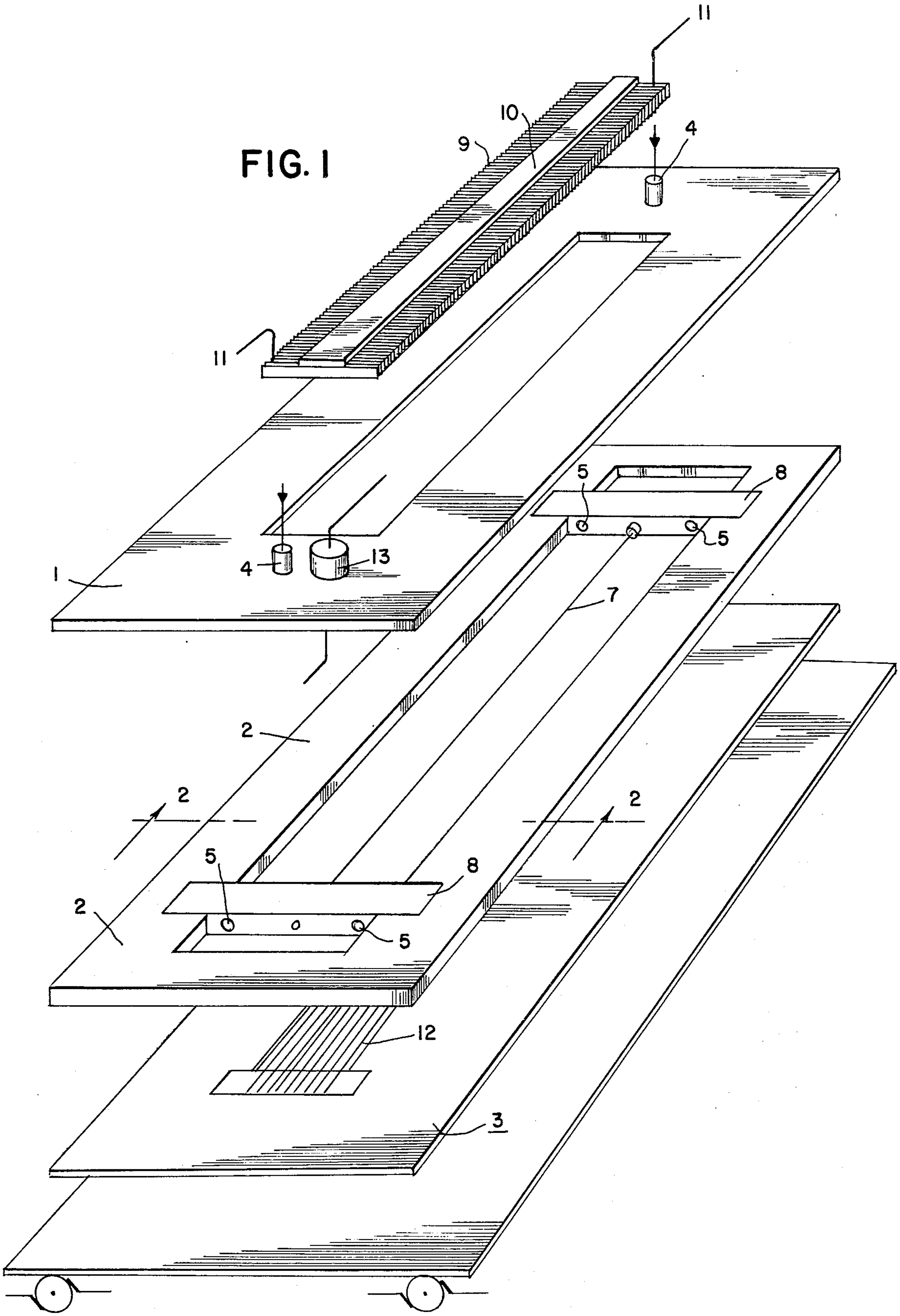
FIG. 1 is a partial three-dimensional view of this invention.

The delay line is a flat coil with a solid core of insulating material, which has no high frequency losses in the frequency range being used. A uniform capacity distribution is obtained in positioning one metal strip at a small distance, i.e., spaced in close proximity along one of the larger sides of the coil, such that the signals induced into the delay line do not suffer a significant attenuation. The counter wall opposite to the entrance window is part of the delay line. The lower surface of the coil is conductive and is part of the counter cathode.

This very simple delay line has the following properties: For a delay time of $T_D=500$ nsec over 250 mm length the change of rise time, $T_R$, is 25 nsec, and therefore $T_D/T_R=20$, and the pulse height attenuation is less than 10%.

It is of great advantage to measure the energy loss of the ionizing radiation inside the counter to achieve a higher spatial resolution. This energy loss is a measure of the angle of incidence of the radiation. Particles entering perpendicular to the anode wires have a shorter track length inside the counter than inclined tracks. The perpendicular tracks therefore produce smaller signals than inclined tracks. It is surprising that this effect is even enhanced when the counter is operated for a particular gas mixture with very high charge multiplication, i.e. high operating voltage. This effect can be probably explained by the fact that perpendicular entering tracks generate a highly concentrated charge avalanche in a small volume and, therefore, produce much smaller pulses due to the space charge screening present, as would be expected from their primary ionization. This space charge effect is absent for inclined entering tracks. The undesired tracks for achieving a high spatial resolution can therefore easily be eliminated by pulse height discrimination. It is very surprising that this discrimination is possible in spite of the continuous energy spectrum of the emitted beta particles.

In addition it has been discovered, that the spatial resolution could be improved in reducing the height of the inner counter volume. Therefore, the inner counter height was made smaller than 10 mm in further developing the invention. In this case the track length of the ionizing radiation being detected is limited inside the counter and the design is approaching the ideal case of an infinitely thin detector. The problem consists in detecting within one detector plane the surface distribution of isotopically emitted radiation.

It is of advantage that the counter has an open entrance window of more than 100 mm length and 10 mm width and, to stretch in the plane of the entrance window, several wires (or a wire mesh) connected to a fixed electrical potential e.g., that is, normally a ground potential.

It is of further advantage that the counting gas is introduced at the two opposite head sides of the counter. For a very long entrance window (more than 20 cm) it could be of advantage to introduce the counting gas along the side walls of the counter at several orifices.

Also an advantage that is possible is that the inner space of the counter should exceed by 5 mm at least, each side of the entrance window. In this case a stabilizing counting gas layer is formed, which does not mix with the surrounding air.

It also is of advantage that the diaphragm containing the entrance window exceeds the last one on each side by at least 15 mm, to stabilize the layer of counting gas between the surface to be measured and the entrance window.

To measure a two dimensional radioactive distribution, the apparatus is equipped with an electronically controlled mechanical device, moving the thin layer plate to be measured relative to the position sensitive counter (perpendicular to its longer axis) without touching the counter.

Figure 2:
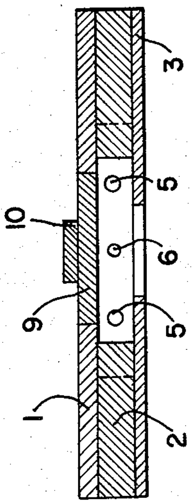
FIG. 2 is a partial cross-section of the apparatus of FIG. 1 through A—A.

A practical example of the present invention is shown schematically in FIG. 1 and FIG. 2. When the proportional counter is operating, the top plate (1), the coil (9)

and the metal strip (10) of the delay line, the counter chamber (2) and the diaphragm with entrance window (3) are mounted together. The counting gas enters via the orifices (4) of the top plate (1) into the chamber (2) and enters via the orifices (5) into the counter volume. Reference number 6 shown in FIG. 2 is the orifice in which the support of the anode wire 7 is held, as shown in FIG. 1. The counting wire (7) is stretched in between the two insulators (8). The high voltage to the counting wire is connected at the plug (13). At the bottom the counter is closed off with the diaphragm plate (3). Several potential wires (12) are stretched inside the entrance window.

Figure 3:
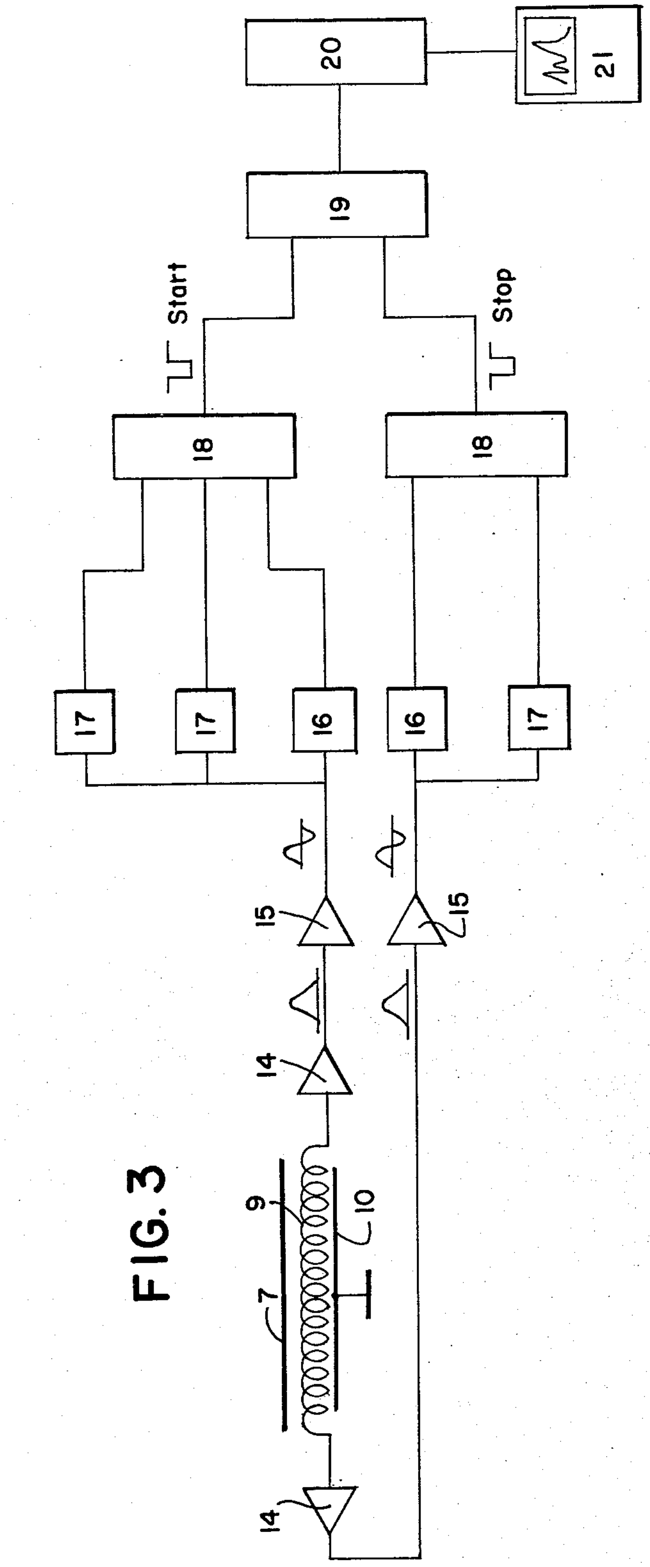
FIG. 3 is a partial schematic drawing of the circuitry for the apparatus of FIG. 1.

The electronics block diagram is indicated in FIG. 3. The two ends (11) of the delay line are each connected to preamplifiers (14), and their signals are introduced via the shaping amplifiers (15) to the zero cross discriminators (16), permitting a measurement of the difference of propagation time down to 1 nsec. Simultaneously the pulse height of the signals is measured with the three discriminators (17). In setting the proper thresholds of these discriminators, it is possible to select particle tracks of more or less perpendicular angle of incidence relative to the wire.

The signals of the discriminators (16) and (17) are fed to the coincidence units (18) generating according to the coincidence condition a start and stop signal to measure the propagation time.

For further data processing, the signals go to a time—digital converter (19) or a time amplitude converter to be stored in a normal pulse height multichannel analyzer (20) to be analyzed quantitatively. On a display (CRT or TV—screen) (21) the activity distribution can be directly visualized and evaluated.

With the apparatus described in the present invention it is possible to distinguish without any difficulty $^{3}H$ radiation sources down to 0.5 mm distance and $^{14}C$ sources down to 1 mm distance. The measuring time to detect several hundred decays per minute (dpm) is in the range of minutes.

What is claimed is:

1. A position sensitive proportional counter of high resolution having at least one anode counting wire with delay line read out, counting gas therein, and which is provided with an open entrance window to measure a surface distribution of ionizing radiation, comprising a counter wall opposite to the entrance window and that forms at least part of the delay line for seeing the counting wires under the largest possible solid angle of the ionizing radiation.

2. The counter of claim 1 having means to achieve a high spatial resolution including means wherein the energy loss of the ionizing radiation in the counter is measured by discriminating the pulse height between a lower and upper limit corresponding to a given ionizing radiation track length in the counter for selecting radiation of perpendicular direction to the counting wire.

3. The counter of claim 1 having a counting gas and gas amplification provided by high voltage at the counting wire such as to obtain a very high charge multiplication of primary ionization so that, by space charge screening, tracks perpendicular to the wire produce much smaller pulses than expected from primary ionization, whereas inclined tracks have no space charge screening and produce pulses proportional to the primary ionization so that this mode of operation allows easy discrimination between tracks perpendicular to the wire and inclined tracks, resulting in a high spatial resolution by the detector.

4. The counter of claim 1 having an open entrance window that is positioned above a surface to be measured without touching it.

5. The counter of claim 1 comprising a thin layer surface plate that can be moved relative to the counter above the plate without touching it by means of an electronically controlled mechanical device.

6. The counter of claim 1 in which inner counter space measured from the open entrance window to lower surface of the delay line does not exceed 10 mm.

7. The counter of claim 1 in which inner counter space is at each side wider than the entrance window.

8. The counter of claim 1 having an entrance diaphragm that extends at least 15 mm on each side of the entrance window.

9. The counter of claim 1 having an entrance window that contains several stretched wires forming a wire mesh being connected to a fixed electrical potential.

10. The counter of claim 1 having an entrance window that has a length of at least 100 mm.

11. The counter of claim 1 having an entrance window that has a width of at least 10 mm.

12. The counter of claim 1 having a counting gas that is introduced at opposite sides of the counter.

13. The counter of claim 1 having a counting gas that is introduced at several points.

14. The counter of claim 1 in which the delay line is a flat coil.

15. The counter of claim 14 in which the delay line has a metal strip at a small distance along one of the sides of the coil to produce a uniform capacity distribution, such that signals induced into the delay line do not suffer a significant attenuation.

16. The counter of claim 15 in which the delay line is shaped with a support of insulating material to provide a delay time of $T_D=500$ nsec over a length of up to at least about a 250 mm length, and a change of rise time $T_R$ of 25 nsec, whereby $T_D/T_R=20$ for providing a pulse height attenuation of less than 10%.

17. The counter of claim 15 having a delay line that is a flat coil with a core of insulating material which substantially has no high frequency losses in at least one frequency range.

18. The counter of claim 17 where the insulating material forms a support for the coil.

19. The counter of claim 18 in which the delay line has cathode means forming a conductive surface opposite to the open entrance window.

20. The counter of claim 1 having a means forming several stretched wires between the open entrance window and a surface to be measured.

21. The counter of claim 1 having a counting gas that is introduced at several orifices.

22. The counter of claim 1 having a stabilizing counting gas layer that does not mix with surrounding air.

23. The counter of claim 1 having an open entrance window that contains wire connected to a fixed electrical potential.

24. The counter of claim 1 having means forming wire between the open entrance window and a surface to be measured and that is connected to a fixed electrical potential.

* * * * *